Feb. 19, 1957  B. N. INMAN  2,782,107
REACTOR FOR MAKING HYDROGEN CYANIDE
Filed Jan. 14, 1953

INVENTOR
BYRON N. INMAN
BY *Frank J. Dobrovolny*
ATTORNEY 2,782,107

REACTOR FOR MAKING HYDROGEN CYANIDE

Byron N. Inman, Tonawanda Township, Erie County, N. Y., assignor to E. I. du Pont de Nemours and Company, Wilmington, Del., a corporation of Delaware Application January 14, 1953, Serial No. 331,207

6 Claims. (Cl. 23—288)

This invention relates to a process and reactor for effecting chemical conversions in the vapor phase and more particularly to a process and reactor for producing hydrogen cyanide by means of such conversions.

While several methods are known for preparing hydrogen cyanide, the commercial processes generally employed involve the catalytic conversion of readily available gases which contain hydrogen, carbon and nitrogen. A direct synthesis of the cyanide can for example be obtained by reacting ammonia with a hydrocarbon. Since this reaction is rather highly endothermic, the resultant heat deficiency must be supplied from some external source. Andrussow U. S. P. 1,934,838 makes up this deficiency by adding oxygen and an excess of the hydrocarbon to the reaction mixture. Lacy U. S. P. 2,076,953 solves the same problem by substituting nitric oxide for ammonia.

The conversion described is normally carried out in the presence of a catalyst, preferably one of the platinum metals or an alloy of these metals inter se. The physical embodiment of the catalyst is not critical. The fine gauze or net of Andrussow, loc. cit., is for example perfectly satisfactory, permitting contact between the catalyst and the gas stream but at the same time maintaining an uninterrupted passage for the latter. Alternatively the catalyst may consist of finely divided particles supported on an inert carrier such as silica or beryl. Harris U. S. P. 2,079,404 discloses a suitable catalyst of the latter type. In some cases gauze may be used in conjunction with a granular supporting base, the gauze resting on the upstream side of the base. The supporting base may be completely inert or it may itself contain platinized particles. Whatever the form of the catalyst, however, it is utilized in a fixed bed rather than in a fluidized bed.

Since the actual formation of hydrogen cyanide is endothermic, it is favored by elevated temperatures. Sufficient heat is therefore supplied, usually in the manner of Andrussow, to raise the temperature to at least 1000° C. Heretofore a large proportion of this heat has been lost during the passage of effluent gases to heat exchangers located at some distance from the reactor in which the conversion takes place. Various attempts have been made to place the heat exchanger in close proximity with the reactor, as for example immediately beneath it, but all have heretofore been unsuccessful. The failures experienced before the present invention are largely due to the fact that iron is a catalyst for the decomposition of hydrogen cyanide and thus should not be used in reactors for making the gas while alternate construction materials do not possess enough physical strength to give satisfactory results.

In some apparatus a closed reactor has been employed in which the catalyst rests upon a refractory such as a perforated sillimanite plate through which the hot effluent gases pass. The span bridged by the sillimanite plate in such apparatus must be quite short for the plate to have sufficient inherent strength at the high temperatures involved to support the weight of the catalyst and the forces developed by the gases flowing through the bed. As a consequence the cross-sectional area of the reactor must be very small with resultant lowered production rates overcome only by unduly high space velocities of the reactants or by costly duplication of facilities. Attempts have also been made to utilize reactors with large cross-sectional areas spanned by sillimanite plates supported on water-cooled pipes. Plates sustained in this manner invariably crack possibly because of thermal strains developed between the hot and cold sides thereof. In addition, any failure to supply water to the pipes causes them to burn out and drop the catalyst bed.

To minimize heat losses, possible reaction between hydrogen cyanide and accompanying gases and decomposition of the cyanide from contact with hot metallic surfaces, effluent gases must be cooled as rapidly as possible after conversion in the catalyst zone. Consequently a reactor uniting a catalyst bed and a heat exchanger within the same structure remains desirable. If, however, the product gases containing both hydrogen cyanide and ammonia are cooled too much, that is below the dew point of the mixture, generally 60–70° C., side reactions occur yielding such compounds as azulmic acid. The cooling process must therefore be carefully controlled.

An object of this invention is to improve the existing processes for catalytically converting gaseous mixtures containing nitrogenous and carbonaceous compounds to hydrogen cyanide so that the effluent gases may be cooled more rapidly than has heretofore been possible. A second object of the invention is development of a process for making hydrogen cyanide in which a maximum of the heat generated therein can be efficiently recovered.

Another object of the invention is to develop a reactor in which effluent cyanide gases can be cooled rapidly by indirect heat transfer without dilution with a cooling medium. A further object is development of a reactor which can cool effluent cyanide gases with a minimum heat loss. Another object of the invention is development of a reactor in which the cooling of effluent cyanide gases can be carefully controlled. A further object of the invention is to provide safe and efficient means for supporting a catalyst bed of any size within a hydrogen cyanide reactor. Another object is to provide a novel reactor for any process where it is desirable to cool catalytic conversion products immediately after they leave the catalyst bed. Still further objects will be evident from the more detailed description of the invention given hereinafter.

The above-mentioned objectives may be accomplished by use of an upright generally cylindrical reactor divided into three main sections. The upper section consists of a mixing chamber in the shape of a cone. The cone is positioned above the second section which consists of a fixed or immobile catalyst in the form of a gauze supported by a particulate mass or a granular catalyst bed. A typical granular bed comprises three consecutive layers, an upper catalytic layer formed by one or more of the platinum metals deposited on inert particles, an intermediate porous supporting layer and a bottom layer insulating the hot reaction gases from metallic surfaces adjacent the catalyst bed. The mixing chamber and the catalyst are supported by the lowest section of the reactor, a vertically disposed shell and tube heat exchanger. The heat exchanger possesses a concave top, protected by suitable insulation, upon which rests the catalyst in open contact with the mixing chamber. The catalyst and the heat exchanger may be housed within a unitary steel container to which the cone of the mixing chamber, formed of aluminum, may be tightly bolted. For best results the aluminum cone should be externally water cooled.

The operation of the reactor is believed evident from the description. A reaction mixture comprising usually ammonia, natural gas and oxygen or air is forced into the top part of the reactor. A hot spot may be initially formed on the catalyst by means of a resistance wire and the mixture ignited therein. The gases are passed downwardly through the catalyst and ammonia reacted with the carbonaceous gas to form hydrogen cyanide. Product gases are then conducted into the tubes of the heat exchanger and rapidly cooled to not less than about 60–70° C. The cooled mixture of hydrogen cyanide, residual ammonia and other gases is finally separated into its components by known methods.

Additional details of the invention may be found by reference to the drawings in which a given numeral always designates the same or an identical part. In these drawings.

Figure 2:
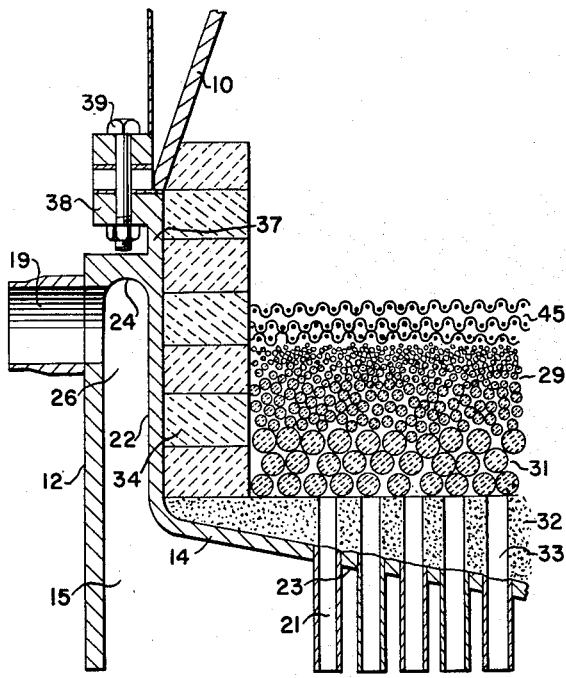
Figure 2 is an enlargement of that section of Figure 1 designated by the lines 2—2.
Figure 1:
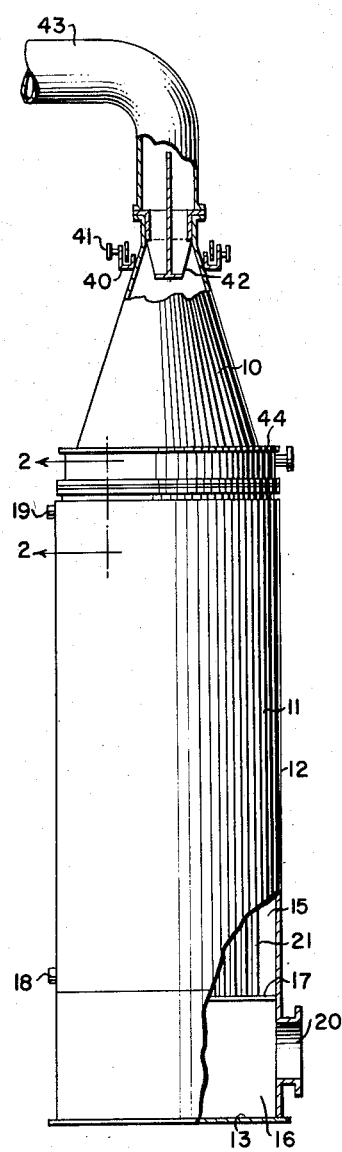
Figure 1 is an elevation, partly in section, of the reactor of the invention.

Referring now particularly to Figures 1 and 2, a hollow cone 10 is shown supported by a heat exchanger 11. Heat exchanger 11 is in the general form of a substantially closed hollow cylinder possessing an external wall 12, a flat base 13 and a top 14. Within the heat exchanger is located steam chamber 15 and a collecting chamber 16 for effluent gases separated from each other by means of partition 17. Steam chamber 15 possesses a lower water inlet 18 and an upper steam outlet 19. Collecting chamber 16 has a single gas outlet 20 but a plurality of inlets formed by tubes 21 which vertically pass through the steam chamber 15 and join top 14 to open into the space above the top. Steam chamber 15 and collecting chamber 16 together with tubes 21, comprise two fluid conductive systems with no internal communication between them.

Top 14 consists of a relatively short reentrant cylinder 22 of lesser diameter than but coaxial with cylindrical wall 12 of the heat exchanger 11, a tube sheet 23 substantially closing the lower end of the reentrant cylinder 22 and extending convexly into steam chamber 15 and a flat annulus 24 joining the upper end of cylinder 22 integrally with external wall 12. A pocket is defined in top 14 by the reentrant cylinder 22 and the tube sheet 23, opens into cone 10 and is connected through tubes 21 to collecting chamber 16 at the bottom of the heat exchanger. Fluid passage is thus provided between cone 10 and collecting chamber 16. Water leg or steam leg 26, defined by wall 12, annulus 24 and cylinder 22, opens into the steam chamber 15 and aids in cooling cylinder 22. Tube sheet 23 preferably extends convexly into the steam chamber 15 to prevent an accumulation of steam or non-condensible gases which may insulate the sheet from the cooling effect of the water. Sheet 23 may possess the configuration of an inverted cone, a spherical segment or any other geometrical figure that can eliminate gas insulation in the manner described. Outlet 19 connects with the water leg 26 so that steam will be withdrawn at a point in the heat exchanger definitely above the tube sheet.

Within the reentrant part of top 14 are a plurality of catalytic gauzes 45 held in place by the force of gravity. Preferred gauzes are formed from platinum-rhodium alloys containing between 50 and 90% platinum. They may be separated from each other by refractory pellets (not shown) if it is so desired. Gauzes 45 are supported on a bed of graded pellets 29 resting upon a layer of larger irregular masses 31 supported in turn by refractory plate 32. Refractory plate 32 insulates the catalyst from tube sheet 23 of the heat exchanger. Pellets 29 may optionally be omitted from this embodiment of the invention and the gauzes supported directly by the irregular masses 31. Refractory plate 32 may be either precast and cemented to tube sheet 23 or formed in situ.

In either case holes 33 are cored in the cast plate aligned with tubes 21, thereby providing an unobstructed passageway for converted gases. The plate 32 is most conveniently formed in situ by inserting wooden plugs into the tubes 21 extending into the space to be occupied by the plate, pouring a sillimanite or other refractory cement into the space and allowing it to harden and finally removing the plugs.

Cone 10 may be removably fixed to the heat exchanger in any desirable manner. Thus a web 37 may be extended upwardly from annulus 24 in a physical continuation of cylinder 22 terminating in an outwardly projecting flange 38. The cone is fastened to this flange 38 as by bolt 39. Refractory brickwork 34 extends above the limits of web 37 and affords to the cone some protection against the temperatures generated in the catalyst bed. Aluminum has been found to be a perfectly satisfactory material for the construction of cone 10 so long as it is well cooled. Accordingly trough 40 is provided at the top of and external to the cone to distribute cooling water supplied from inlet 41. The water is collected after use by drip pan 44. Other cooling means may of course be utilized as for example a jacket (not shown) surrounding the cone. Baffle 42 located internally at the top of the cone thoroughly mixes all gases entering the reactor from conduit 43.

When this reactor is in operation a suitable reaction mixture of natural gas, air and ammonia is pumped into the cone and forced downwardly through the catalyst and ignited. The reaction is self-sustaining after preliminary initiation. The effluent gases are conducted through the cored holes 33 and the tubes 21 where water in steam chamber 15 abstracts heat from the reaction gases and is itself converted at least partially to steam. The cooled gases pass into the collecting chamber 16 and out of the reactor to be separated. In practice five gauzes of 90% platinum-10% rhodium alloy placed on top of an inert catalyst bed with respective ¼ inch layers of ceramic packing between the gauzes will effect a 67% conversion of ammonia to hydrogen cyanide from an ammonia-natural gas-air feed mixture. The loss of precious metals from the gauzes amounts to less than 8% after about 950 hours of service. Six gauzes of 80% platinum-20% rhodium alloy effect a 62% conversion of ammonia to hydrogen cyanide with less than a 4% loss of precious metals after 950 hours of service.

Figure 3:
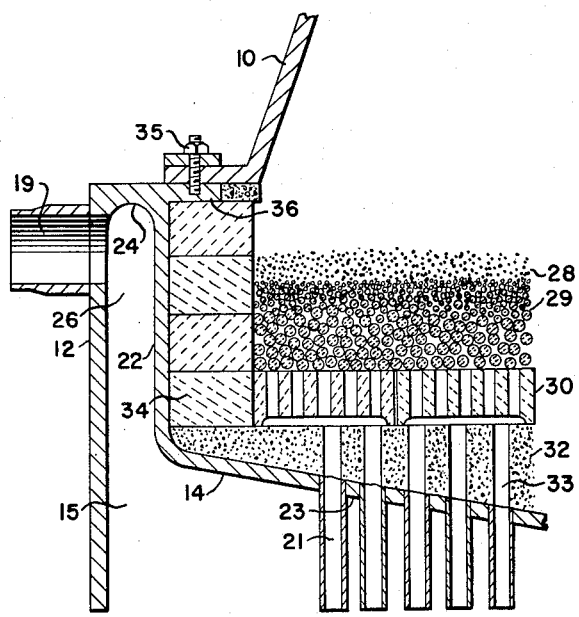
Figure 3 is a detail of a section of a reactor corresponding to that of Figure 2 showing a second embodiment of the invention.

In the embodiment of the invention shown by Figure 3, a cone 10 is removably secured to a heat exchanger 11 by means of bolt 35 attached to an internally projecting extension 36 of annulus 24. This method of attachment is in some respects not as desirable as that of the previous figures since the differing expansion rates of iron, aluminum and the brickwork 34 may cause the latter to crack. Furthermore the brickwork does not extend over any part of the aluminum cone and can afford no protection thereto. While no water cooling system is depicted for the cone of Figure 3, it will readily be understood that the system of Figure 2 or any convenient alternative may be adopted.

Within the reactor of Figure 3 is positioned a second embodiment of the catalyst bed. The bed previously described can of course be utilized here or conversely that now shown can be used in the reactor of Figures 1 and 2. The catalyst bed shown in Figure 3 consists of a layer 28 of finely divided catalytic particles supported on a mass of graded pellets 29 ranging in size from fine particles immediately underneath layer 28 to relatively coarse pellets at the bottom of the mass. The particles of layer 28, individually, consists of beryl or other inert material covered with a suitable catalyst such as platinum or a platinum alloy. The pellets of mass 29, besides being inert and resistant to heat, must provide a porous support for the catalyst to allow free passage of the reaction gases. Many ceramic and refractor articles on the market form satisfactory supports including such things as bricks, pellets, irregular granules, cylinders, Raschig rings, Berl saddles, hollow tiles and the like. Some of these objects are so shaped that a catalyst bed may be made by stacking them in preconceived fashion or by dumping them at random, a porous mass being formed by either method.

In practice a suitable granular catalyst bed can be made up with a layer 28 between about ¾ and 1-1½ inches thick, the thickness being proportional to the gas velocity employed, resting on a supporting mass 29 preferably comprised of four sizes of alumina cylinders, a separate layer being formed by each of four sizes of pellets. A preferred supporting mass 29 consists of a 1½ inch thick bottom layer of ⅝ inch cylinders, a ¾ inch thick lower intermediate layer of ⅜ inch cylinders, a ½ inch thick upper intermediate layer of ¼ inch cylinders and a ¼ inch thick top layer of ⅛ inch cylinders. These graded cylinders of mass 29 may rest upon a layer of refractory tile 30, the tile being arranged in an oriented fashion so that substantially vertical passages for gases are formed thereby.

The catalyst 28 and its supports 29 and 30 may be collectively referred to as a catalyst bed. However, the same term may be applied to a catalytic gauze 45 and its accompanying supports such as 29 and 31. Therefore, in this specification and in the appended claims the term "catalyst bed" will refer to a catalyst either of the granular or of the gauze type together with its respective supports. Where it is desired to refer to a catalyst bed consisting solely of particles, no gauze being present, the expression "granular catalyst bed" will be employed.

The cyanide product gases leave the catalyst bed of this invention at a temperature of approximately 1150° C. It is desirable to reduce the temperature to the vicinity of 200° C. to 300° C. as quickly as possible to prevent undue thermal decomposition of the hydrogen cyanide or side-reactions with the accompanying gases. By means of the arrangement described hereinbefore, the hydrogen cyanide can be cooled to a stable temperature of 300° C. or less in a period of no more than about two seconds after leaving the last particle of catalytic material. The average cooling rate may thus be in excess of 400° C. per second. As noted previously cooling below the dew point must be avoided to prevent polymerization of mixtures containing both ammonia and hydrogen cyanide. The dew point temperature is around 60-70° C., 65° C. being about average, but 100° is the lowest temperature usually employed. Excess cooling can easily be avoided by controlling the temperature and rate of flow of water in the steam chamber.

Before being cooled, the hot hydrogen cyanide is prevented from touching any metallic surfaces by inert materials interposed between the gas and metals. Suitable materials are ceramics or refractories and include alumina, porcelain, silica, zirconia and the like free from iron, cobalt and other metals promoting the cracking of hydrogen cyanide. Thus decomposition of hydrogen cyanide caused by contact with uncooled iron and steel surfaces is kept at a minimum. Although the distinctive advantages evident can be obtained by operating at a space velocity in the catalysts of up to 500,000 hours$^{-1}$, it is preferred to operate at a space velocity of 200,000 to 300,000 hours$^{-1}$. The term space velocity is used with its ordinary meaning of gas volume passing through a unit volume of catalyst per hour, standard conditions of temperature and pressure being assumed for gas measurements.

To illustrate the superiority of this invention, a comparison was made between a reaction carried out in a converter previously employed and one carried out in the reactor of this invention. Both reactors contained a granular catalyst bed. The comparison system consisted of a catalyst bed supported on a thick sillimanite plate resting in turn on water-cooled pipes. Below the plate was a water-jacketed inverted cone funneling the effluent gases through ten foot length of uncooled alloy steel (25Ni—12Cr) into a heat exchanger. The two converters produced hydrogen cyanide from the same mixture of natural gas, air, and ammonia under substantially the same operating conditions. The temperature of the reaction was 1100° C., the molar feed ratio of natural gas:air:ammonia was 1.7:9:1 and the space velocity was 50,000 to 200,000 hours$^{-1}$. The yield produced by the comparison system was, at a maximum, 57.8% while the yield produced by the system of this invention was 62.8%. The lower yield in the comparison system is attributed to the contact with hot metal surfaces conducting the gases to the waste heat boiler. The importance of rapid cooling and of minimum contact time between effluent gases and ferrous metals is thus clearly demonstrated. The comparison system also dissipated much of the heat recovered by the instant reactor.

The yield obtainable from the reactor disclosed may be increased to some extent by utilization of a catalyst bed combining the features of the beds shown in Figures 2 and 3. To form such a composite bed, one or more platinum-rhodium gauzes are placed on top of the layer 28 of Figure 3. Conversions of up to 70% may be obtained with a bed constructed in this manner. A composite bed can be conveniently made from a granular catalyst bed which has become deactivated through use. Placing one or two gauzes on top of such deactivated material will restore conversions to a 65-70% level. Green U. S. P. 2,381,344 shows a catalyst bed essentially of this composite type.

This invention is subject to several additional modifications which will be evident. The converter need not, for example, always be held in an upright position. If it is turned on its side, however, the use of a catalyst gauze is almost imperative to facilitate retention of the catalyst in position. In the side position the heat exchanger still remains contiguous to the catalyst bed. Since however the greatest benefit from the effects of gravity are obtained only when the reactor is upright, this latter position with downward flow of gases is preferred.

Accordingly, directions on or paralleling the longitudinal axis of the reactor are referred to in this specification as vertical. It is furthermore not absolutely essential that the reactor be of a circular cross-section. A square or other section may be employed. The circular section affords the greatest ease in assembly and construction and is therefore preferred.

While the instant reactor has been described primarily with respect to the production of hydrogen cyanide, it is not limited thereto. It may, in fact, be employed with many catalytic vapor phase reactions which use a fixed bed catalyst and present special difficulties because of the corrosive or unstable nature of the products. Such reactions may include the conversion of methanol to formaldehyde, the isomerization and cracking of hydrocarbons, the steam conversion of methane to synthesis gas, the conversion of carbon monoxide and steam to carbon dioxide and hydrogen, chlorinations, dechlorinations, the oxidation of ammonia and many other oxidations. Still other reactions may, of course, be carried out in this reactor.

Having now described my invention, I claim:

1. A reactor for making hydrogen cyanide by the reaction between ammonia, oxygen and hydrocarbon comprising a cylindrical heat exchanger with a bottom gas collecting chamber and a coolant chamber separated from the gas collecting chamber by means of a partition, a gas mixing chamber joined to the top of the heat exchanger, a reentrant pocket in the top of said heat exchanger opening onto the gas mixing chamber, a plurality of tubes opening into the collecting chamber, supported by the partition and passing through the coolant chamber to connect with the reentrant pocket, a platinum metals porous catalyst bed in said pocket, said catalyst bed being exposed to said gas mixing chamber, a conduit for admitting gases to the gas mixing chamber and means for withdrawing cooled effluent gases from the gas collecting chamber.

2. The reactor of claim 1 in which the reentrant pocket is formed by a cylinder, coaxial with but smaller in diameter than the external wall of the heat exchanger, closed at the end extending into the heat exchanger by means of a perforated metallic sheet extending convexly still further into the heat exchanger.

3. The reactor of claim 2 in which the reentrant cylinder is joined integrally with the external wall of the heat exchanger by means of a flat annulus forming with said wall and said cylinder a steam leg serving as an effluent steam collector.

4. The reactor of claim 3 in which the gas mixing chamber is a cone removably secured to an internally projecting extension of the annulus.

5. The reactor of claim 3 in which the gas mixing chamber is a cone removably secured to an outwardly projecting flange supported by a web lengthening the reentrant cylinder.

6. The reactor of claim 3 comprising heat insulating means between the catalyst bed and all metallic surfaces that would otherwise contact the bed.

References Cited in the file of this patent

UNITED STATES PATENTS

| | | |
|---|---|---|
| 1,036,473 | Eschellmann et al. | Aug. 20, 1912 |
| 1,426,952 | Bosch | Aug. 22, 1922 |
| 1,595,711 | Cornelier | Aug. 10, 1926 |
| 2,185,928 | Simpson et al. | Jan. 2, 1940 |
| 2,444,661 | Maude | July 6, 1948 |
| 2,496,999 | Houpt et al. | Feb. 7, 1950 |
| 2,532,514 | Phinney | Dec. 5, 1950 |
| 2,584,080 | Houpt | Jan. 29, 1952 |
| 2,585,441 | Cornell et al. | Feb. 12, 1952 |
| 2,607,663 | Perry et al. | Aug. 19, 1952 |

FOREIGN PATENTS

| | | |
|---|---|---|
| 583,889 | Great Britain | Jan. 2, 1947 |